United States Patent
Zoppitelli et al.

(10) Patent No.: US 6,676,074 B2
(45) Date of Patent: Jan. 13, 2004

(54) DUAL PISTON DRAG DAMPER FOR ROTARY-WING AIRCRAFT ROTOR

(75) Inventors: Elio Zoppitelli, Velaux (FR); Philippe Legendre, Grans en Provence (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 10/356,898

(22) Filed: Feb. 3, 2003

(65) Prior Publication Data
US 2003/0146343 A1 Aug. 7, 2003

(30) Foreign Application Priority Data
Feb. 6, 2002 (FR) .............................. 02 01407

(51) Int. Cl.⁷ .............................................. B64C 27/00
(52) U.S. Cl. .................. 244/17.11; 244/17.13; 244/17.25; 244/17.27; 416/140; 416/106
(58) Field of Search .......................... 244/17.11, 17.13, 244/17.25, 17.27; 416/140, 106, 107

(56) References Cited

U.S. PATENT DOCUMENTS

| | | | | |
|---|---|---|---|---|
| 2,494,985 A | * | 1/1950 | Campbell | .................... 416/106 |
| 2,777,544 A | * | 1/1957 | O'Connor | |
| 3,297,284 A | | 1/1967 | Pellerin | |
| 3,484,173 A | * | 12/1969 | Rybicki | ...................... 416/106 |
| 3,638,885 A | | 2/1972 | Reed | |
| 3,923,419 A | | 12/1975 | Mouille | |
| 4,084,668 A | | 4/1978 | Rybicki | |
| 4,304,525 A | | 12/1981 | Mouille | |
| 4,407,633 A | | 10/1983 | Mouille | |
| 4,556,365 A | | 12/1985 | Mouille | |
| 4,732,540 A | | 3/1988 | Mouille | |
| 5,141,398 A | * | 8/1992 | Bietenhader et al. | ........ 416/140 |
| 5,501,434 A | * | 3/1996 | McGuire | ...................... 416/140 |
| 5,636,970 A | * | 6/1997 | Certain | ......................... 416/106 |
| 5,951,251 A | * | 9/1999 | Mondet et al. | .............. 416/106 |
| 6,092,795 A | * | 7/2000 | McGuire | ..................... 416/140 |
| 6,140,720 A | * | 10/2000 | Certain | |

FOREIGN PATENT DOCUMENTS

| | | |
|---|---|---|
| DE | 1264165 | 3/1968 |
| EP | 1 130 280 | 9/2001 |
| JP | 55126139 | 9/1980 |

* cited by examiner

Primary Examiner—Michael J. Carone
Assistant Examiner—L. Semunegus
(74) Attorney, Agent, or Firm—Sturm & Fix LLP

(57) ABSTRACT

A drag damper for use on a rotary wing aircraft rotor comprises a body defining two variable volume chambers linked by a piston. The chambers are filled with fluid and are connected by a restriction port (35) and by a channel (32) of larger cross-section than the restriction port. A secondary piston slidable and pressure-tight piston is fitted in the channel and loaded by an elastic bias (34). The equivalent mass of this secondary piston (33) and of the fluid which it displaces, and the stiffness of the elastic bias (34) are such that the secondary piston is resonant in the channel (32) at the rotation frequency of the rotor, to filter the dynamic component at this frequency of stresses applied to the damper (20). Furthermore at the natural drag frequency of the corresponding blade, the elastic bias substantially blocks the secondary piston (33) in its channel (32), and the flow of fluid between the chambers (29, 30) of the damper (20) takes place mainly via the restriction port (35) calibrated to provide substantial damping at this frequency.

17 Claims, 5 Drawing Sheets

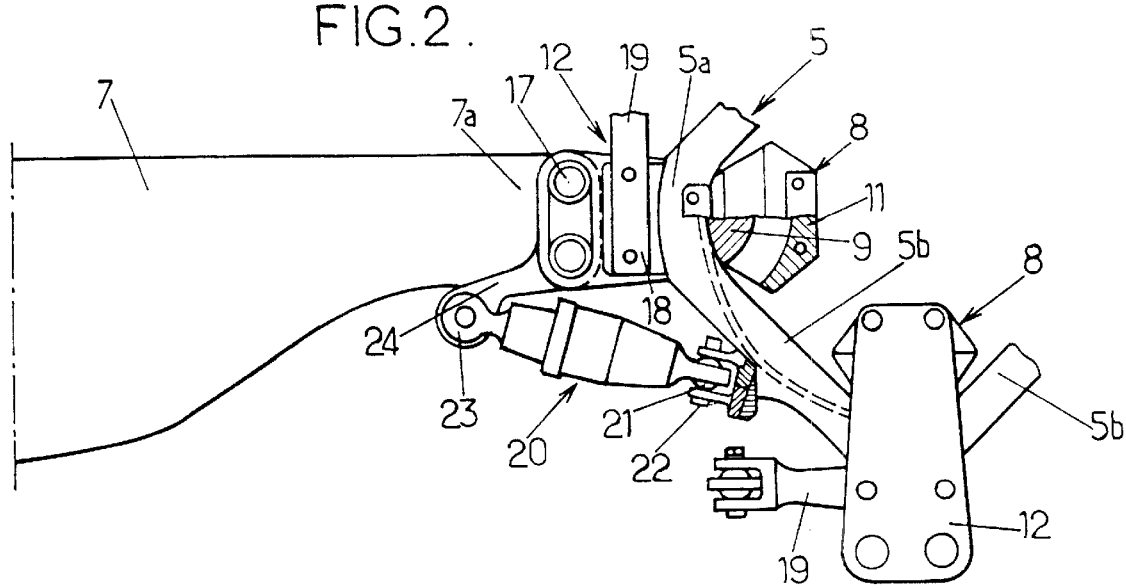
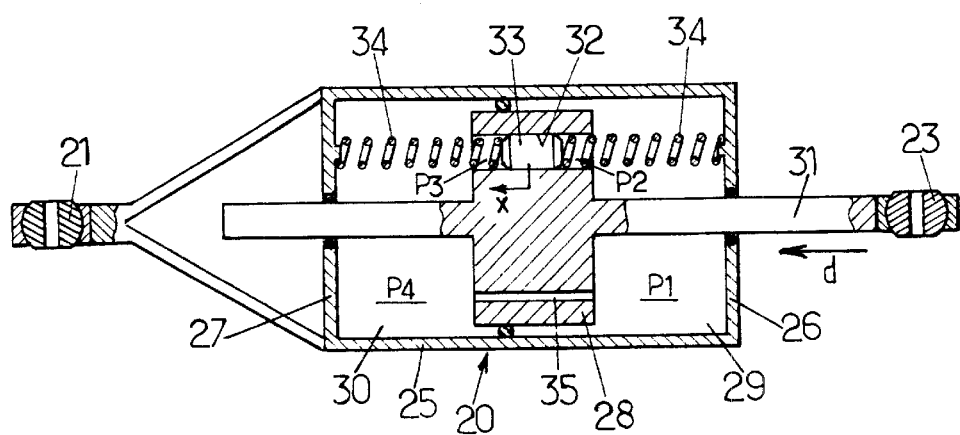

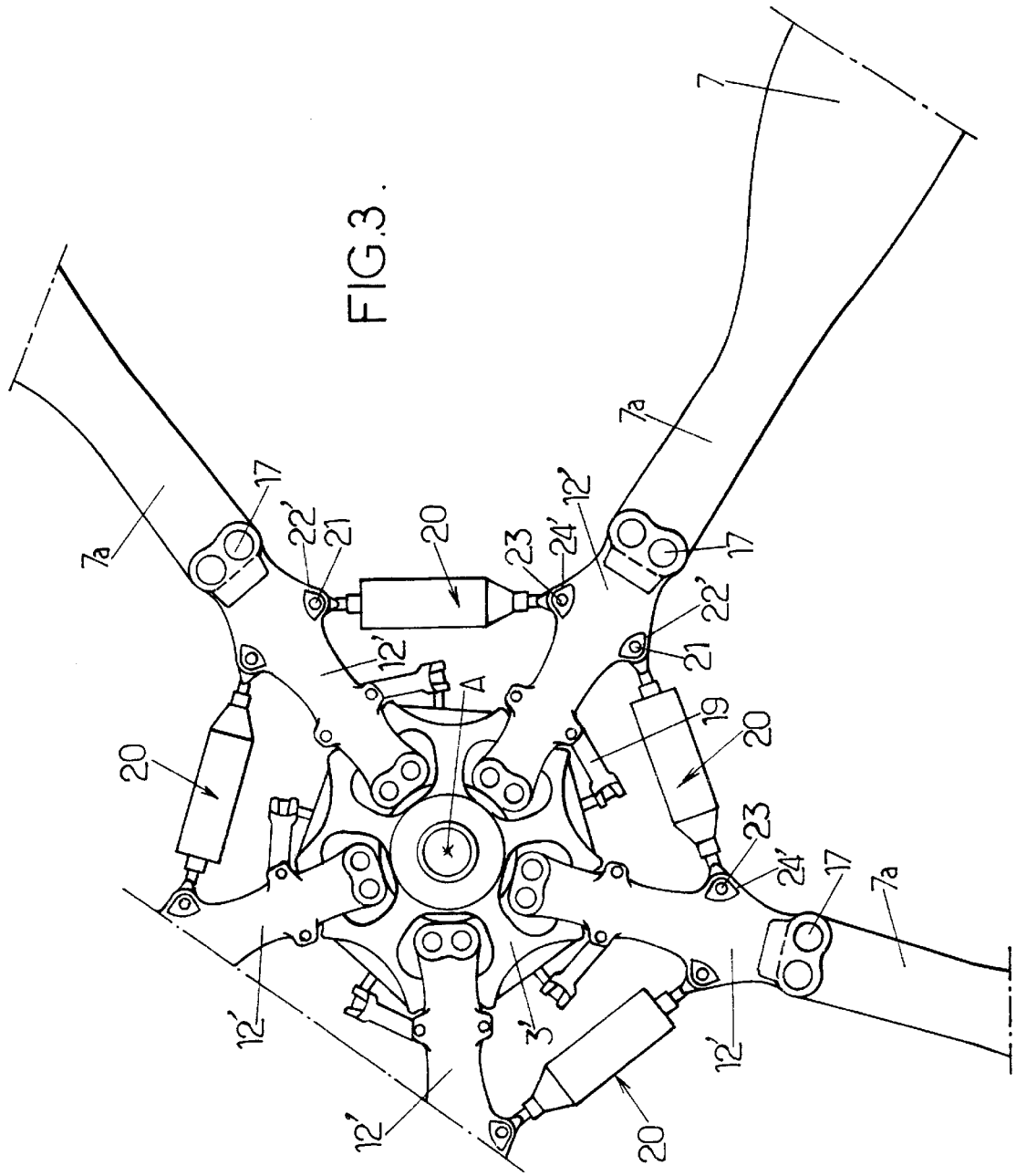

DUAL PISTON DRAG DAMPER FOR ROTARY-WING AIRCRAFT ROTOR

FIELD OF THE INVENTION

The invention relates to a drag damper for a rotary-wing aircraft rotor comprising a hub and at least two blades each of which is connected to the hub by a corresponding connection device. The drag damper is intended for fitting between two elements, one of which is a flapping mass comprising one of the blades and the corresponding connection device, and the other element is one of the hub (in the conventional configuration) and an adjacent flapping mass on the rotor (in the so-called inter-blade configuration). In use, the drag damper will dampen the relative angular drag movements between said two elements, namely: in the first case (conventional configuration), the angular drag movements of said flapping mass relative to the hub, i.e. the angular deflections of the blade, and more generally of the corresponding flapping mass, about its drag axis, which is substantially parallel to the axis of rotation of the rotor; and in the second case (inter-blade configuration), the relative angular drag movements between said two adjacent flapping masses, i.e. the relative angular deflections of the corresponding two adjacent blades of the rotor about their drag axes, which are substantially parallel to the axis of rotation of the rotor.

The rotor is more particularly a helicopter main rotor subject to the instability phenomena known as ground resonance and air resonance, although a conventional tail rotor may also be equipped with drag dampers according to the invention.

BACKGROUND TO THE INVENTION

On rotors of the hinged type, the device connecting a blade to the hub may be arranged as a means of securing the blade and hinging it to the hub, when the blade is connected by its root, possibly in the form of a fork, to the hub, or as a device which is substantially radial (relative to the rotor axis) generally termed a cuff, and fitted with yokes at the ends to be connected to the blade root on the one hand and on the other to means of securing and hinging, such as a spherical laminated stop, itself connecting it to the hub. On rotors of the semi-rigid type, this connecting device may be a flexible torsion arm, at the blade root, and surrounded by a torsionally rigid cuff integral with the blade root for controlling the blade in pitch, which is connected and hinged to the hub by this flexible torsion arm.

Numerous different embodiments of drag dampers are known, particularly dampers which are hydraulic, hydropneumatic, laminated with at least one layer of visco-elastic material stressed between two rigid fittings, or comprising combinations of these different means, these drag dampers comprising means of elastic return of defined stiffness and damping, when they are fitted to helicopter main rotors, to combat the resonance phenomena mentioned above.

It is a well-known practice to design helicopter rotor blades and therefore the corresponding flapping masses having a natural drag frequency, also termed first drag mode or natural drag mode, which is different from the nominal rotation frequency at which the rotor is designed to be driven.

More generally, to avoid in particular fatigue problems resulting from the dynamic stresses in the blades and the fuselage, and problems of vibration levels in the fuselage, it is essential to position correctly the natural frequencies of the blades in flapping, torsion and drag relative to the nominal rotation speed of the rotor and its harmonics (multiples).

This results from the fact that a helicopter rotor constitutes a powerful vibration generator. Because of the variable angles of incidence and speeds of rotor blades and also of helicopters, alternating loads of aerodynamic origin are developed particularly in the blades of rotors, and give rise in the latter to stresses as well as reactions on the attachments, particularly of the blades to the hubs. From this there result alternating loads and moments on the rotor heads, and the development of high vibration and stress levels in fuselages. The response of each blade, the stresses to which this blade is subjected and the loads which this blade transmits to the hub at the centre of the rotor are all the greater as at least one natural frequency of the blade (in drag, flapping and torsion) is close to the rotation frequency $\Omega$ of the rotor or one of its harmonics $n\Omega$ (where n is a whole number).

The dynamic characteristics of the rotor blades are therefore chosen to obtain suitable dynamic matching by ensuring that their natural vibration frequencies in flapping, drag and torsion are correctly positioned relative to the nominal rotation frequency $\Omega$ of the rotor and its multiples $n\Omega$, which is why it is necessary to observe certain simple rules for positioning the frequencies, and in particular two essential rules. The first rule is to avoid positioning a natural vibration frequency in flapping, drag or torsion on or very close to a harmonic of the rotation speed $n\Omega$ (where $n \geq 1$), and the second rule is to endeavour as far as possible to position only one of these three natural frequencies between two adjacent harmonics $n\Omega$ and $(n+1)\Omega$ of the rotation speed in order to avoid coupling. In addition to these two essential rules, it is imperative to follow recommendations proper to each type of deformation in flapping, drag or torsion.

Concerning the recommendations relating particularly to the drag is modes for hinged or semi-rigid (semi-hinged) rotors, the first drag mode (or natural drag frequency) is at the origin of ground resonance and air resonance problems due to coupling with modes of the helicopter structure.

On a rotor with blades hinged in drag, the angular frequency or pulsatance of the first drag mode is given by the expression:

$$\omega\delta = \Omega\left(\frac{e \cdot M\delta}{I\delta}\right)^{1/2}$$

where e is the drag eccentricity of each blade, $M\delta$ is the static moment of the flapping mass (blade+device connecting it to the hub) relative to the hinge (drag axis) and $I\delta$ is the inertia of the flapping mass relative to this drag hinge.

On a semi-rigid rotor, the first drag mode of a blade or flapping mass depends on the characteristics not only of the blade or flapping mass but also of the hub. The pulsatance of the first drag mode is then given by the expression:

$$\omega\delta = \Omega\left(\frac{e \cdot M\delta}{I\delta} + \frac{k\delta}{\Omega^2 I\delta}\right)^{1/2}$$

where $k\delta$ is the stiffness of the drag damper fitted between the blade or corresponding flapping mass and the hub of the rotor.

The positioning of the first drag mode of a blade or of the corresponding flapping mass depends upon the modes of the helicopter structure on the ground (fuselage mass, inertia, stiffness of the landing gear and of any tyres which may be fitted to it), these modes of the structure being generally determined by specific tests, adjustment of the first drag mode being obtained by altering the term kδ representing the stiffness of the drag damper.

As a general rule, as the upper limit of the first drag mode ωδ, a value close to three-quarters of the nominal rotation frequency Ω of the rotor is taken, so as not to introduce excessively high stresses in the blades of the rotors.

For this reason, when the rotor is started up or stopped, and also at the end of a landing by the helicopter in autorotation, the instantaneous speed of rotation of the rotor intersects the resonance drag frequency situated below the nominal speed. Because of this, and also because of the fairly large range of variations in rotor rotation speeds which are authorised for helicopters in flight, it is necessary to increase damping at the natural vibration frequencies of the blades in drag, and if necessary to reduce this natural frequency by means of drag dampers, which is the reason why these dampers are also termed frequency adapters, the aim being that the blades should be sufficiently damped in drag to avoid going into resonance.

The invention relates more specifically to a drag damper of the general type comprising a tubular damper body in which a piston moving integrally with a damper rod and slidable axially is fitted, and in the damper body delimits two opposing variable volume working chambers, filled with a fluid of which volumes are transferred, by passing the fluid through at least one restriction port arranged between the piston and the body and/or in the piston, between the working chambers when the piston moves in the damper body.

A drag damper of this kind, known in particular from FR 2 063 969, may be hinged on the one hand to a fixed point on the hub or on a bracket connected to the rotor hub, by means connecting the body or one end, external to said body, of the damper rod and on the other to a fixed point on the corresponding flapping mass, at the blade root of this flapping mass or on a device connecting this blade to the hub, by means connecting the end of the rod external to the body or the damper body respectively in the conventional configuration or, in the inter-blade configuration, to two fixed points on two adjacent flapping masses, by means connecting on the one hand the damper body to the fixed point on a flapping mass and on the other, the end of the rod external to the damper body to the fixed point on the other flapping mass.

In the conventional configuration, as the hinging point at one end of the drag damper on the hub or a bracket fixed to the hub is situated between the blade on which the drag damper is hinged at its other end and an adjacent blade, the stiffness of the damper introduces an equivalent angular stiffness, opposed to the angular deflections of the blade relative to the hub about its drag axis. It is thus possible to increase the natural frequency of the blades in drag to escape from the two resonance phenomena mentioned above, with additional damping at the natural drag frequency ωδ of the blade when the phenomena of air and ground resonance occur.

However, it is known these phenomena rarely appear during the life of a helicopter. Most of the time, the drag dampers are subject to forced excitation at the rotation frequency Ω of the rotor, on which the drag dampers dissipate energy to no purpose.

The mean power dissipated in a drag damper of a rotor can be expressed by the following relation: $Pd=\pi . K''.f.Xe^2$, where K" is the dissipative stiffness of the damper, f the frequency of the movement applied to the damper (axial movement of the rod-piston assembly in the body) and Xe is the movement of said rod-piston assembly associated with frequency f.

For example, for drag dampers of the type presented above fitted in the conventional configuration to a four-bladed main rotor of a helicopter with a weight of about 8 to 10 tonnes, a comparison of the energy dissipated on the forced excitation at the rotation frequency Ω with that which is dissipated on the natural drag frequency ωδ of the blades gives the following results.

For the same dissipative stiffness K" of 400 daN/mm, the forced excitation at Ω with a frequency f of 4.5 Hz corresponds to an associated displacement Xe of 4 mm, that is to say a dissipated power of 900 W, whereas for the natural drag mode ωδ at a frequency f of 2 Hz, causing an associated displacement Xe of 1 mm, there corresponds a dissipated power of about 25 W.

Each drag damper therefore dissipates 97% of its energy on forced excitation at Ω. Under these conditions of use, this energy is dissipated to no purpose, which entails substantial fatigue in the components not only of the drag damper but of the means connecting it to the hub and to the flapping mass, and consequently wasted weight due to oversizing of these parts.

On the helicopter with a weight of about 8 to 10 t considered, the forces applied to the drag dampers upon forced excitation at Ω are very high, which may cause incidents in service such as cracks in the yokes connecting the drag dampers to the flapping masses, damage to the drag damper pins at the end where there are connected to the hub and also damage to the fittings connecting the drag dampers to the hub, and rapid deterioration of the ball joints used in these connection devices.

In the inter-blade configuration, the same is true of the yokes, pins and fittings connecting the drag dampers to the corresponding adjacent flapping masses.

To summarise and in other words, the excitation of the drag dampers has a twofold component:

a forced response, at the nominal rotation frequency Ω of the rotor, which adversely affects reliability and the service life of the mechanical parts of the drag damper as well as of its devices connecting it to the hub and to the corresponding flapping mass or masses, and a natural response, at the natural drag frequency of the corresponding flapping mass, which must be damped to avoid instability.

Known drag dampers of the types presented above damp the unstable mode in two different ways:

by adding stiffness on drag dampers with at least one layer of visco-elastic material, as the loss angle of the visco-elastic material is small, drag dampers of this type being appropriate for helicopters of low and medium tonnage, by adding damping, when the use of excessively stiff drag dampers would involve excessive penalties in terms of loads, which is suitable for heavy helicopters.

In all cases, the dual-frequency stresses applied to drag dampers cause a substantial loss in the damping of the natural response, at the natural drag frequency of the flapping mass, which is a low frequency relative to the rotation frequency Ω of the rotor, this substantial loss of damping leading to the use of excess damping which adversely affects the reliability of the mechanical parts of the drag dampers as well as of their connections.

SUMMARY OF THE INVENTION

The idea underlying the invention is to propose a drag damper for helicopter rotor blades, the damper being of the general type mentioned above and having at least two passages for fluid between the working chambers, each of the passages being dedicated more specifically to dealing with one respectively of the two frequencies corresponding to the forced response at Ω and to the natural response at ωδ, which eliminates damping of the dynamic component at the rotation frequency Ω of the rotor, and only provides damping of the drag movement of the blades at the natural drag frequency ωδ with the aim of improving the behaviour in service of all of the components constituting the damper and of the components connecting the damper to the hub and to a flapping mass, or to two adjacent flapping masses, at the same time enabling the weight of the drag damper and of the parts to which it is connected to be reduced.

To this end, the drag damper according to the invention is a drag damper as known from FR 2 063 969, and comprising:

a tubular damper body closed by two end faces, a main piston slidable axially fitted in the body and delimiting in said body two opposing variable volume working chambers, a rod moving integrally with the main piston and running substantially axially through at least one end face of the body, said body and said rod each comprising means of connection to one respectively of the two components between which said drag damper is fitted (the hub and a flapping mass or two adjacent flapping masses), a fluid filling at least the two working chambers in the body, and at least one restriction port made in the drag damper, for example in the main piston and/or between the main piston and the body and/or in a part of the body, and capable of restricting fluid passing from one working chamber to the other when the main piston is moved in the body;

wherein the drag damper further comprises at least one channel communicating with the two working chambers, the at least one channel being fitted with a slidable and substantially pressure-tight secondary piston which is subject to loading by an elastic bias tending to return said secondary piston to a neutral position in said channel, with the at least one channel having a greater cross-sectional area than the restriction port, and with the secondary piston and the elastic bias being dimensioned in such a way that the secondary piston has a resonance frequency in the channel substantially equal to the rotation frequency of the rotor, in order to filter a dynamic component of stresses applied to the damper at the rotation frequency of the rotor; and wherein the elastic bias substantially blocks the secondary piston in said channel at the natural drag frequency of the flapping mass; and wherein said at least one restriction port is calibrated so as to damp substantially relative movements of the rod-main piston assembly and of the damper body at a frequency which is substantially equal to the natural drag frequency of the flapping mass.

The drag damper according to the invention has the advantage of comprising at least two passages between the working chambers, one of which, with a larger cross-section that the other, houses a secondary piston, floating and subject to loading from the elastic bias, to filter or suppress the dynamic component at Ω in the stresses, by setting the resonance frequency of the secondary piston in the passage which receives it to the rotation frequency Ω of the rotor, while providing substantial damping for the natural drag mode of the blades at ωδ by means of the other passage with a smaller cross-section, to counter the problems of air and ground resonance, without degrading the filtering of the Ω component.

For an excitation at Ω, the resonance of the secondary piston allows practically free circulation of fluid between the working chambers and the channel in which the secondary piston is resonant, since the pressure loss in this channel is very much less than that of the restriction port, through which the flow of fluid is practically nil, while for an excitation at ωδ, the elastic bias blocks the secondary piston in the channel which receives it, and the fluid circulates substantially through the restriction port while providing damping, which is applied substantially only at the frequency ωδ.

In an advantageously simple embodiment, the channel may be made in the main piston and have longitudinal end portions which each open directly into one respectively of the working chambers.

In this case, according to a basic embodiment, the channel runs substantially axially through the main piston, and the elastic bias advantageously comprises two springs, each running substantially axially through one respectively of the two working chambers and each engaged in one respectively of the longitudinal end portions of said channel, each spring bearing against the secondary piston at one end and at the other end against one respectively of said end faces.

To produce resonance at Ω of the secondary piston and of the fluid displaced by this second piston, this secondary piston and this fluid have an equivalent mass m and the elastic bias has a stiffness K which substantially satisfy the relation $K=m\Omega^2$. This concept of equivalent mass is known, and stems from the fact that the velocity of displacement of fluid in the channel housing the secondary piston is different from the fluid circulation velocities in the working chambers, under the effect of the changes in cross-section. The equivalent mass is that which having a velocity $\dot{x}$ equal to that imparted to the piston, would have the same kinetic energy $\frac{1}{2} m\dot{x}^2$ as that of all of the masses in movement (secondary piston and fluid displaced by this piston).

Consideration of the equivalent mass m means that amplification, if any, of the movement of the fluid with respect to the movement of the secondary piston can be taken into account, in a mode of embodiment of the drag damper utilising the principle of fluid inertia (in which acceleration of the fluid is produced by means of a variation in cross-section of the column of fluid).

According to a variant, the elastic bias may comprise two springs each housed in one respectively of the two longitudinal end parts of said channel, and each bearing at one end against the secondary piston and at the opposite end against the main piston. In this case, to bring about the resonance at Ω of the secondary piston and of the fluid displaced by the latter, this secondary piston and this displaced fluid have an equivalent mass m and the elastic bias has a stiffness K which substantially satisfy the relation $$K = m\Omega^2\left(1 - \frac{s1}{s0}\right),$$

where s1 and s0 are cross-section areas of the at least one channel and main piston respectively.

According to another variant, precisely utilising the principle of fluid inertia, as mentioned above, the body of the drag damper comprises two tubular casings rigidly connected to each other, one of which is an outer casing closed by said end faces, and the other is an inner casing, arranged inside the outer casing so as to delimit with the latter at least one area with a narrowed cross-section, and in which is fitted the main piston, slidable axially, said inner casing comprising a transverse wall with said rod slidable axially running through it, and in which said channel is made. In this case, it is advantageous that the channel runs substantially axially through said transverse wall of said inner casing, and said elastic bias comprises at least one spring bearing at one end against one of said end faces and at the other against said secondary piston. As a variant, at least one restriction port also runs through said transverse wall of the inner casing or, more generally, a part of the body.

In a simple manner, at least one restriction port may run substantially axially through the main piston, and the latter may be fitted to be slidable and pressure-tight in said body.

Moreover, to achieve substantially the blocking of the secondary piston by the elastic bias and the flow of fluid substantially through the restriction port, in order to obtain high damping at the natural drag frequency $\omega\delta$ of the flapping mass, the stiffness K of the elastic bias is greater than a threshold value. In the case of singular pressure losses via the restriction port, said threshold value is substantially equal to $$\omega\delta.v2.\lambda2.s1^2/s2,$$

where $\lambda 2$ is the coefficient of singular pressure loss of said at least one restriction port; v2 the maximum velocity of circulation of said fluid in said restriction port; and s2 is a cross-sectional area of the at least one channel. The coefficient $\lambda 2$ links the pressure loss $\Delta P$ caused by the restriction port and the velocity v2 by the relation: $\Delta P=\lambda 2.v2^2$.

In the case of laminar pressure losses via the restriction port, said threshold value is substantially equal to:

$$\omega\delta \cdot C2 \cdot \frac{s1^2}{s2},$$

where C2 is the laminar pressure loss coefficient linking the pressure loss $\Delta P$ and the velocity v2 by the relation: $\Delta P=C2.v2$.

To ensure optimum restriction of the fluid at the natural drag frequency $\omega\delta$, the main piston may have a plurality of restriction port drillings calibrated to different cross sections.

As a variant, at least one restriction port may run through a part of the damper body or said secondary piston.

BRIEF DESCRIPTION OF DRAWINGS

Other characteristics and advantages of the invention will become clear from the description given below by way of non-limiting examples of embodiment described with reference to the appended drawings in which:

FIG. 2 is a partial schematic view, partly in section and partly in plan of the rotor head in FIG. 1, with a drag damper fitted in the conventional configuration between each of the blades of the rotor and the hub, FIG. 3 is a schematic view in plan of a rotor head similar to the one in FIGS. 1 and 2, but for a five-bladed rotor, on which each drag damper is fitted in the so-called inter-blade configuration, between two adjacent blades of the rotor, FIG. 4 is a schematic view in axial section of a first example of drag damper according to the invention.

DETAILED DESCRIPTION OF SPECIFIC EMBODIMENTS

Figure 1:
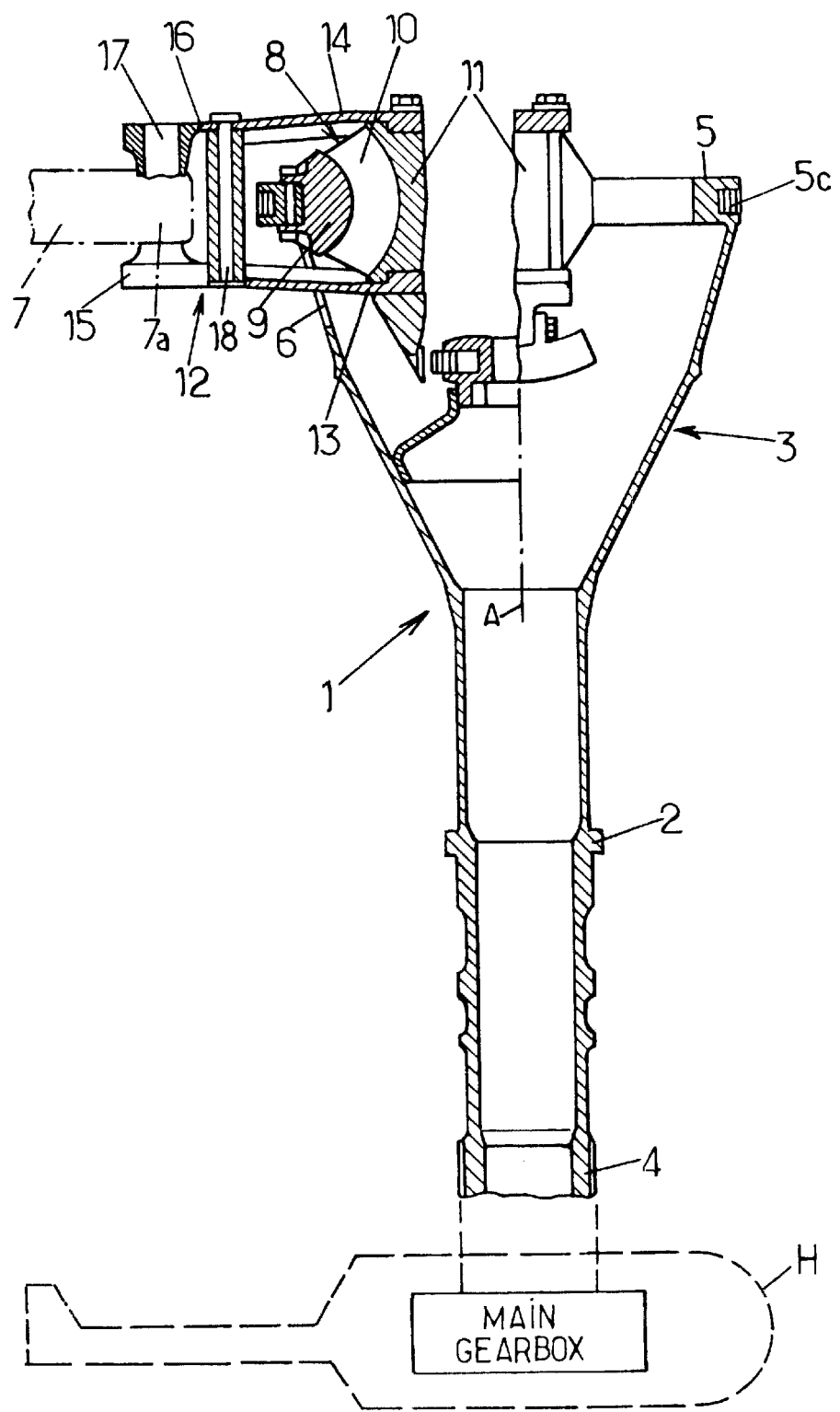
FIG. 1 is a schematic view in axial half-section in the left-hand half-view and in offset section in the right-hand half-view, for a four-bladed helicopter main rotor.
Figure 5:
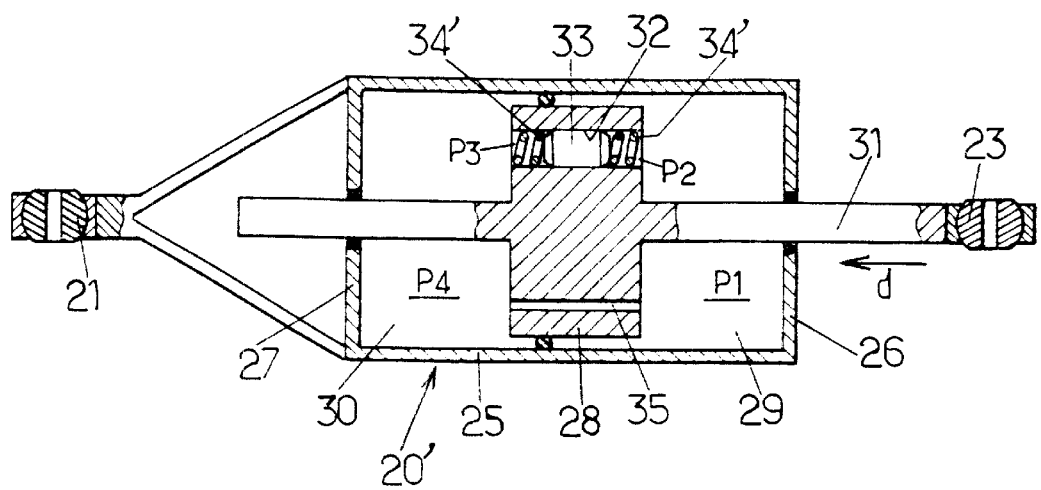
FIG. 5 is a view similar to FIG. 4 of a second example of a drag damper according to the invention.

FIGS. 1 and 2 show schematically the head of a four-bladed helicopter main rotor substantially as described in EP 0 213 016 with reference to FIGS. 4 and 5 of that document, to which reference may advantageously be made for further details.

It will be recalled that this rotor head comprises a one-piece tubular mast-hub 1, the lower substantially cylindrical part of which forms a mast 2 with a base 4 designed to be connected in rotation to a main gearbox of the helicopter H (shown schematically in phantom outline) to drive the rotor in rotation about the axis A of the mast-hub 1. The latter also comprises an upper part forming a hub 3, which is an extension of the mast 2 and has the general external shape substantially of a truncated cone hollowed out at the end opposite to the mast 2 as far as a reinforcement ring 5 which constitutes the upper free end, thickened locally on its periphery, of the hub 3. Radial (relative to axis A) openings 6, identical and equal in number to the number of rotor blades, are made in the portion of hub 3 which is directly adjacent to the ring 5 and are regularly distributed in a circumferential direction over the periphery of this portion of hub 3. Each opening 6 has a roughly half-moon or greatly rounded bean shape, the general concavity of which is facing the ring 5, which surrounds the opening in the upper end of the hub 3. This ring 5, the shape of which in plan (see FIG. 2) is that of a pseudo-regular polygon, with small sides 5a equal, rounded and convex alternating with large sides 5b equal, rectilinear and equal in number to the number of rotor blades, is reinforced by a composite belt 5c in a peripheral groove in the ring 5. Each of the openings 6 is made in the hub 3 directly under one respectively of the small sides 5a of the ring 5, these convex small sides 5a corresponding to the portions of the ring 5 to which are secured spherical laminated stops 8 housed in the opening in the upper end of the hub 3 and constituting the devices for securing and hinging the blades 7 to the mast-hub 1.

The spherical laminated stops 8 are well-known components, each hinging a blade 7 to the hub 3 about the three axes of flapping, drag and pitch change of the blade, which intersect at the pivoting point determined by the centre of rotation of the corresponding spherical laminated stop 8. Each stop 8 mainly comprises a central laminated part 10 constituted by an alternating stack of rigid layers, of metal for example, and of a visco-elastic material, such as a synthetic rubber, and in the form of segments of a sphere, this central laminated part being vulcanised between two rigid fittings 9, 11, of metal for example.

Each spherical laminated stop 8 is placed against the inner face of the ring 5 and is secured against the latter by its external radial fitting 9 shaped as a fork straddling the ring 5 at an opening 6 while its inner radial fitting 11, integral with the laminated central part 10 on the side opposite the outer fitting 9 is secured by bolting as spacers between the two branches 13 and 14 of an inner radial yoke of a connecting device 12, termed a cuff, connecting a blade 7 to the hub 3 via the corresponding spherical laminated stop 8. In this method of assembly, the lower branch 13 of the inner radial yoke 13–14 of the cuff 12 runs through the corresponding opening 6.

The blade 7 has its root 7a secured between the two branches 15 and 16 of an external radial yoke of the cuff 12 by two tubular pins 17, parallel with each other and approximately with the rotor axis A, and passing through aligned bores in the blade root 7a and the branches 15 and 16 of this outer yoke.

In the simple form of embodiment in FIGS. 1 and 2, the radial connecting cuff 12 comprises two radial plates arranged substantially one above the other, the lower plate embodying the lower branches 13 and 15 and the upper plate embodying the upper branches 14 and 16 of the respectively inner and outer yokes of the cuff 12, and these two plates have as a spacer between them the inner fitting 11 of the stop 8 and, outside the ring 5, by a spacer 18 onto which the two plates are bolted, and which supports a laterally projecting pitch change lever 19 for controlling the pitch of the corresponding blade 7.

Drag damping of each flapping mass constituted by a blade 7 and its cuff 12 connecting it to the hub 3, and the elastic return of this flapping mass to its neutral axis are provided by a device external to the mast-hub 1 and arranged laterally, in the conventional configuration on the rotor in FIGS. 1 and 2, between the ring 5 of the hub 3 and this flapping mass. This device, termed a drag damper, an elastic drag return strut with built-in damping or even a frequency adapter, is a device 20 arranged as a particular hydraulic damper the structure and mode of operation of which are described below with reference to FIGS. 4 to 8.

In the conventional configuration according to FIG. 2, the drag damper 20 is coupled by a ball joint 21 at its inner end in an attachment yoke 22 fitted onto to an outward radial projection from the ring 5, substantially in the middle of the large side 5b of this ring 5 which extends between the cuff 12 of the blade 7 considered and the cuff 12 of an adjacent blade 7 of the rotor.

At its outer end, the damper 20 is coupled by a ball joint 23 in a yoke formed between two fittings 24 which each form a single part with one of the two lower and upper plates of the connecting cuff 12, each fitting 24 extending both radially outwards and towards the trailing edge of the corresponding blade 7, starting from the outer radial end of the corresponding lower or upper plate.

As a variant, as shown in FIG. 3, each drag damper such as 20 may be fitted between two adjacent blades 7 of the rotor, or more precisely between the connecting cuffs 12' of two adjacent blades 7, i.e. between two adjacent flapping masses of the rotor, each flapping mass being constituted by a blade 7 and its device 12' connecting it to the hub 3. On the five-bladed rotor head in FIG. 3, each drag damper 20 is retained and hinged, by its end ball joint 21, to an attachment yoke 22' projecting laterally from the cuff 12' connected to the root 7a of a blade, and by its ball joint 23 at the opposite end, to an attachment yoke 24' projecting laterally from the cuff 12' connected to the root 7a of an adjacent blade. In this way, the dampers 20 are subject to stresses by the differential angular drag movements between the flapping masses 7–12' of the rotor, while in the conventional assembly in FIG. 2, each damper 20 is subject to stresses by the angular drag movements of the flapping mass 7–12 to which it is hinged relative to the hub 3 of the rotor.

Figure 8:
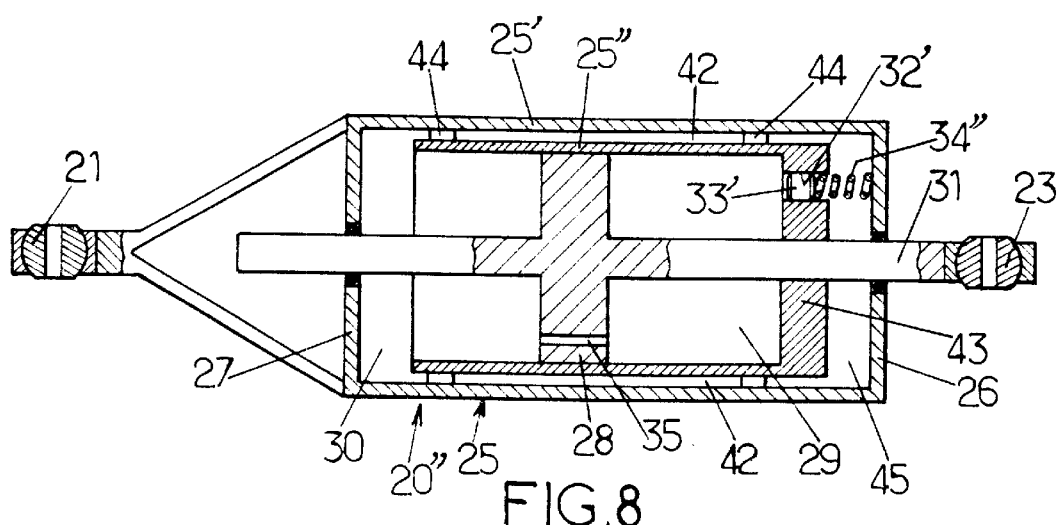
FIG. 8 is a view similar to FIGS. 4 and 5 of a third example of a drag damper according to the invention, of the fluid inertia type.

The drag damper 20, whether coupled between the hub 3 and a flapping mass constituted by a blade 7 and the corresponding cuff 12, as shown in FIG. 2, or between two adjacent flapping masses 7–12' of the rotor, as shown in FIG. 3, is embodied as shown schematically in FIG. 4, or as variants, in FIGS. 5 and 8.

In FIG. 4, the drag damper 20 comprises a cylindrical tubular body 25 of circular cross-section S, closed at its axial ends by two end faces 26 and 27, a main piston 28, slidable axially and pressure-tight in the body 25 and delimiting in this body 25 and between the end faces 26 and 27 two opposing variable volume working chambers 29 and 30, the piston 28 moving integrally with an axial rod 31 running in a pressure-tight manner through the end faces 26 and 27, to be coupled by the ball joint 23 at its free end, external to the cylinder 20, to a flapping mass 7–12 or 7–12', while the body 25 is coupled to the opposite end of the damper 20, by the ball joint fitting 21 to the hub 3 (FIG. 2) or to an adjacent flapping mass 7–12' (FIG. 3).

The main piston 28 has running axially through it two passages opening at their ends directly into the chambers 29 and 30, one of the passages being a channel 32 in which is fitted a secondary piston 33, slidable, substantially pressure-tight and floating, between two identical helical compression springs 34, each running axially through one respectively of the two chambers 29 and 30, and each engaged in one respectively of the axial or longitudinal end parts of the channel 32, so as to bear at one end against the secondary piston 33 and at the other end against the corresponding end face 26 or 27, so as to return the piston 33 to a neutral position in the channel 32.

The channel 32 has a cross-sectional area s1 very much greater, by about one order of magnitude, to that, s2, of the other passage, which is a restriction port 35 calibrated to restrict a fluid, such as a hydraulic oil, filling the damper 20, and in particular the chambers 29 and 30, when the main piston 28 is moved axially in the body 25 by the relative movements in drag of the flapping mass 7–12 or 7–12', connected to the rod 31, and of the hub 3 or of an adjacent flapping mass 7–12', connected to the body 25.

As a variant, as shown in FIG. 5, the springs 34' are no longer connected to the end faces 26 and 27 of the body 25 of the damper 20' as in the basic version in FIG. 4, but the springs 34' are each housed in one respectively of the axial or longitudinal end parts of the channel 32 and bearing at one end against the secondary piston 33 and at the other end against the main piston 28, by this other end of the spring 34' being engaged in a groove or against a shoulder in the corresponding axial end of the channel 32, so as also to return the piston 33 to a neutral position in the channel 32.

When drag damper 20 has stresses applied to it by the movements in drag of a flapping mass 7–12 or 7–12' relative to an adjacent flapping mass 7–12' or relative to the hub 3, and the rod 31-main piston 28 assembly moves axially in the body 25, the secondary piston 33 moves in the channel 32, and if x is the movement of the secondary piston 33 relative to the body 25, and therefore $\ddot{x}$ its acceleration, and if each of the two identical springs 34 has a stiffness K/2, the equilibrium equation of the secondary piston 33 is given, in a damper according to FIG. 4, by the relation (1):

$$m\ddot{x} + Kx = (P2 - P3)s1,$$

where m is the equivalent mass of the secondary piston 33 and of the fluid displaced by this piston 33 (and in this case, not differing greatly from the mass of the secondary piston 33 alone), s1 is the cross-sectional area of the channel 32, and therefore also of the secondary piston 33, and P2 and P3 are the pressures present in the axial end parts of the channel 32, either side of the secondary piston 33, the pressure P2 being that of the end part of the channel 32 which communicates with the one of the two working chambers 29 and 30 undergoing expansion due to the movement of the rod 31-piston 28 assembly, while the pressure P3 is that present in the end part of the channel 32 communicating with the other working chamber 30 or 29, undergoing compression.

If we consider the flows, the flow q1 of fluid entering the channel 32 by the end of the latter communicating with the chamber 29 or 30 under compression, and equal to the flow coming out of this channel 32 at its other end communicating with the chamber 30 or 29 undergoing expansion, is given by the relation q1=s1.$\dot{x}$, where $\dot{x}$ is the velocity of movement of the secondary piston 33 in the channel 32. The flow q2 through the restriction port 35 is given by the expression q2=s2.v2, where s2 and v2 are respectively the cross-sectional area of the restriction port 35 and the velocity of the fluid restricted in this port 35.

The law of conservation of flow gives the relation: q1+q2+(S−s1−s2) $\dot{d}$=0, where d is the movement of the rod 31-piston 28 assembly relative to the body 25, and therefore $\dot{d}$ the velocity of this rod 31-piston 28 assembly, and S is the cross-sectional area of the body 25, close to s0 which is that of the piston 28.

Considering the pressure losses, if λ1a is the coefficient of pressure loss at the connection of the axial end part of the channel 32 towards which the secondary piston 33 is moved, and in which the pressure P2 is present, with the working chamber 29 or 30 undergoing expansion, in which the pressure P1 is present, and if the velocity $\dot{x}$ of the piston 33 is very much greater than the velocity $\dot{d}$ of the rod 31-piston 28 assembly, we have the relation:

$$P2-P1 = -\lambda 1 a(\dot{x}-\dot{d})^2.\text{sign}(\dot{x}-\dot{d}), \text{ i.e. relation (2):}$$

$P2-P1=-\lambda 1 a(\dot{x}-\dot{d}).|\dot{x}-\dot{d}|$, and similarly, if λ1b is the coefficient of pressure loss at the connection of the chamber 30 or 29 undergoing compression, at the pressure P4, with the axial end part of the channel 32 from which the secondary piston 33 is moving away, and in which the pressure P3 is present, we have the relation (3):

$$P4-P3=-\lambda 1 b(\dot{x}-\dot{d}).|\dot{x}-\dot{d}|$$

Whatever the mode of embodiment (FIG. 4 or FIG. 5), a term in $\dot{x}-\dot{d}$, corresponding to the relative movement between fluid and main piston 28 is involved in expressing the pressure losses.

In the case of singular pressure losses, the pressure loss via the restriction port 35 is given by the relation (4): $P4-P1=-\lambda 2 v2|v2|$, where λ2 is the coefficient of singular pressure loss of the port 35, v2 being, as already stated, the velocity of the fluid in this port 35.

Bringing together relation (1) with relations (2) and (3), we obtain the relation (5):

$$m\ddot{x}+Kx=(P1-P4)s1-[(\lambda 1a+\lambda 1b)(\dot{x}-\dot{d})|\dot{x}-\dot{d}|]s1=(P1-P4)s1-\lambda 1.(\dot{x}-\dot{d})|\dot{x}-\dot{d}|s1,$$

where λ1=λ1a+λ1b represents the coefficient of global pressure loss of the channel 32.

Bringing together relation (5) with relation (4), we obtain the relation (6):

$$\frac{1}{s1}(m\ddot{x}+Kx)+\lambda 1(\dot{x}-\dot{d})|\dot{x}-\dot{d}| = P1-P4 = \lambda 2(v2-\dot{d})|v2-\dot{d}|.$$

If the drag damper 20 is dimensioned so that the secondary piston 33 goes into resonance in the channel 32 when the damper 20 has stresses applied at the nominal rotation frequency Ω of the rotor, i.e. if the movement of the secondary piston 33 in the channel 32 takes place at the frequency Ω when the movement of the piston 28 in the body 25 takes place at this same frequency Ω, we then have the relation: m$\ddot{x}$+Kx =0 at this frequency Ω.

As the movement of the second piston 33 is of the sinusoidal type of pulsatance ω, its acceleration $\ddot{x}$ can be expressed in the form: $\ddot{x}$=−ω²x , i.e. at pulsatance Ω, $\ddot{x}$=−Ω².x , which, introduced into the preceding relation, gives the relation (7) mΩ²=K, which is the resonance condition of the secondary piston 33 at the frequency Ω, so that the equivalent mass m and the stiffness K of the two springs 34 are chosen so that the relation (7) is verified.

In the embodiment in FIG. 5, in which the equivalent mass m is likewise not very different from the mass of the secondary piston 33 alone, and with springs 34' connected to the main piston 28, the variation in length of the springs 34' has a value x-d where d is the movement of the main piston 28. Repeating the calculations above taking account of this particularity leads to a condition of correct operation according to the relation:

(7'):

$$K = m\Omega^2\left(1-\frac{s1}{s0}\right).$$

In this example, the parameters K, m, s1 and s0 are therefore chosen so that this relation (7') is verified.

Moreover, since λ2 is close to λ1, since the cross-sections s1 and s2 are both small compared with the cross-section S, and as at the frequency Ω, we deduce from the relation (6) that $\lambda 2(v2-\dot{d})^2$ is approximately equal to $\lambda 1(\dot{x}-\dot{d})^2$, the result is that v2² is approximately equal to $\dot{x}^2$, and v2 is approximately equal to $\dot{x}$, and, as the cross-section s2 is very small compared with the cross-section s1, we have the relation (8): s2v2<<s1$\dot{x}$, i.e. q2<<q1, which means that at the nominal rotation frequency Ω of the rotor, corresponding to the resonance frequency of the secondary piston 33 in the channel 32, the flow of fluid between the two working chambers 29 and 30 passes for the greater part through the channel 32, in which the secondary piston 33 expels a certain volume of fluid into the chamber 29 or 30 undergoing expansion at the same time as the same volume of fluid is admitted on the other side of the piston 33, in the channel 32, coming from the chamber 30 or 29 undergoing compression.

In other words, the rotation frequency Ω of the rotor which by design is greater than the natural drag frequency ωδ of the flapping mass, is a high frequency which excites the secondary piston 33, which does not oppose circulation of the fluid, so that the pressure losses are small, as are the loads transmitted by the rod 31-piston 28 assembly, to which stresses are applied by the flapping mass, to the body 25 connected to the hub 3 or to an adjacent flapping mass.

At the natural drag frequency ωδ of the flapping mass 7–12 or 7–12', the secondary piston 33 is no longer resonant, and the springs 34 or 34' are dimensioned, and in particular each have a stiffness K/2 such that they oppose the movements of the piston 33 in the channel 32, and substantially block this piston 33 in position in this channel 32, so that no substantial circulation of fluid takes place via the channel 32. The flow of fluid between the working chambers 29 and 30, at the stresses applied to the drag damper 20 or 20' at the natural drag frequency ωδ of the flapping mass, therefore takes place mainly via the restriction port 35, calibrated to obtain high damping at this frequency ωδ, which is a low frequency relative to the rotation frequency Ω of the rotor.

It may be considered that the flow of fluid between the working chambers 29 and 30 is substantially the flow q2 passing through the restriction port 35 if $|q2|=|s2\lambda 2|>>|q1|=|s1.\dot{x}|$, i.e. as $\dot{x}=\omega x$ at the frequency ωδ, if we verify the relation (9): $|s1.\omega\delta.x|<<|s2\lambda 2|$.

As in these circumstances it follows from relation (6) that $$\left|\frac{Kx}{s1}\right|$$

is approximately equal to $|\lambda 2v2^2|$, it is deduced from this that $$|x| = \left|\lambda 2 \cdot v2^2 \cdot \frac{s1}{K}\right|,$$

and by inserting this value of x into relation (9), we obtain:

$$\left|s1\omega\delta\left(\lambda 2v2^2\frac{s1}{K}\right)\right| \ll |s2 \cdot v2|,$$

from which relation (10) is obtained:

$$K \gg \frac{s1^2}{s2} \cdot \lambda 2 \cdot \omega\delta \cdot v2.$$

In the case of singular pressure losses, the stiffness K of the springs 34 (or 34') is therefore chosen to verify this relation, according to which K is greater than a threshold value, and in which the maximum velocity v2 of the fluid in the restriction port 35 is considered, taking account of the maximum loads which the drag damper is designed to withstand, the other parameters of the relation (10) being known by design.

In the case of laminar pressure losses, for which the relation linking the pressure loss ΔP and the velocity v2 is ΔP=C2.v2, where C2 is the coefficient of laminar pressure loss, similar calculations show that K must be greater than a threshold value approximately equal to $$\omega\delta \cdot C2 \cdot \frac{s1^2}{s2},$$

i.e. relation (10')

$$K \gg \omega\delta \cdot C2 \cdot \frac{s1^2}{s2}.$$

Figure 6:
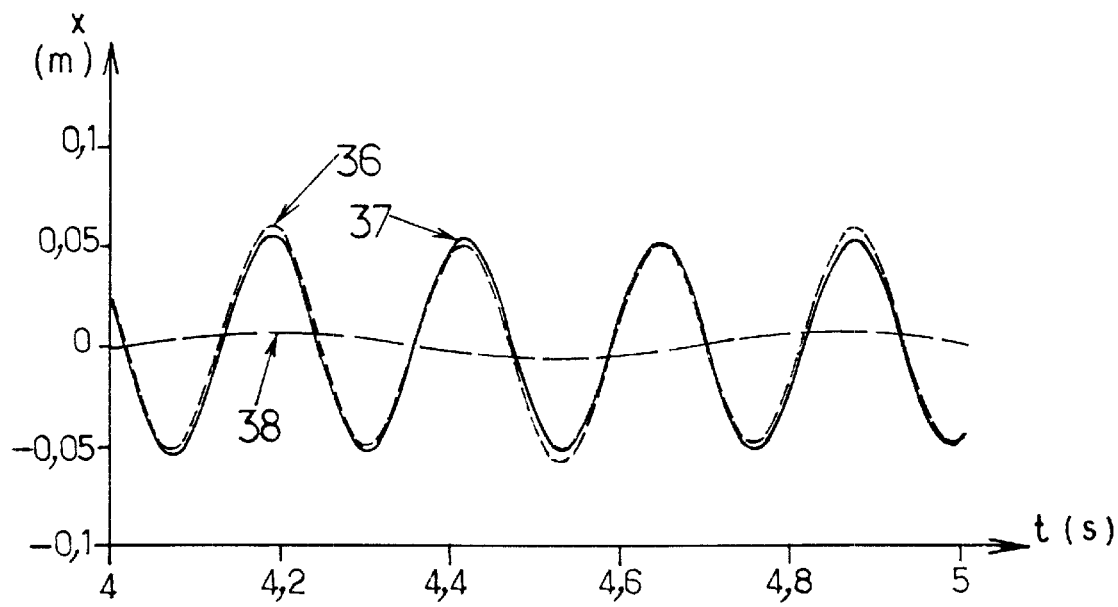
FIGS. 6 and 7 are curves representing respectively the movement of the secondary piston and the velocity of circulation of the fluid in the restriction port as a function of time, during the operation of a drag damper according to FIGS. 4 and 5.

Moreover, it will be recalled that the equivalent mass m of the secondary piston 33 and of the fluid displaced, and the stiffness K verify the relation (7) or (7') mentioned above, so that the relations (7) or (7') and (10) and (10') enable the drag damper 20 or 20' to be dimensioned so that excitation at the rotation frequency Ω of the rotor causes resonance of the secondary piston 33 allowing substantially free circulation of fluid through the channel 32, in preference to the restriction port 35, while for an excitation at the natural drag frequency ωδ of the flapping mass, the springs 34 (or 34') substantially block the secondary piston 33, and the fluid circulates preferentially through the restriction port 35. Generally speaking, for a dual-frequency excitation of the damper 20, the Ω component encounters a lesser resistance via the channel 32, as shown in FIG. 6, whereas the ωδ component encounters a lesser resistance via the restriction port 35, which enables substantial damping to be applied to the low frequency ωδ, as shown in FIG. 6. In fact, FIG. 6 shows as ordinate the movement x (in m) of the secondary piston 33 as a function of time (in s), and x, represented by the curve 36, is equal to the sum xΩ+xωδ, where xΩ is the Ω component, indicated by the curve 37, and which predominates, and xωδ is the ωδ component, represented by the curve 38.

Figure 7:
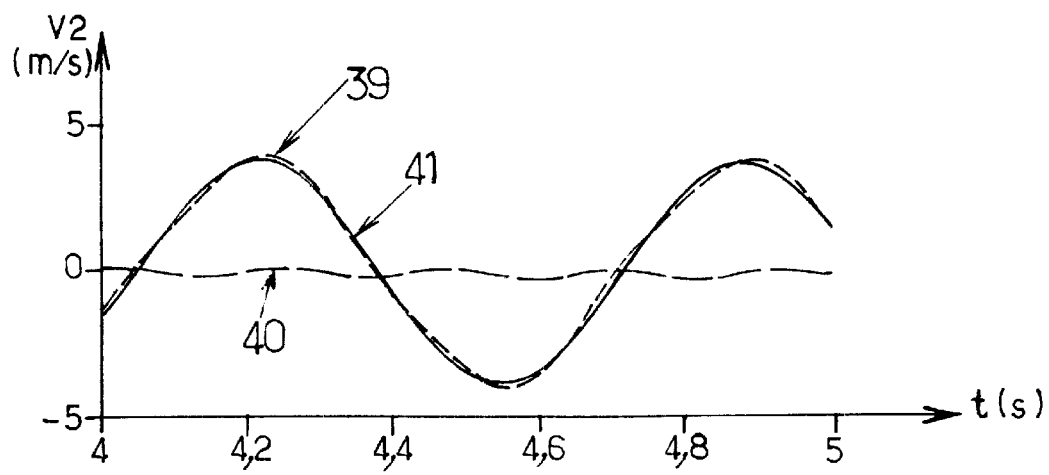

Similarly, FIG. 7 represents as ordinate the velocity v2 (in m/s) in the restriction port 35 as a function of time (in s), and this velocity v2 indicated by the curve 39 is equal to the sum v2Ω+v2 ωδ, where v2Ω is the Ω velocity component indicated by the curve 40, and v2 is the ωδ component, which predominates and is represented by the curve 41.

Thus, the dynamic loads and heat dissipation in the damper 20 or 20' are reduced while obtaining high damping at the natural drag frequency ωδ of the flapping mass.

The example of a drag damper in FIG. 8 operates substantially as those in FIGS. 4 and 5, although the mode of embodiment here utilises the principle of fluid inertia to reduce the actual mass of the secondary piston, taking into account amplification of the movement of the fluid displaced by this secondary piston relative to the movement of the latter, hence a large equivalent mass.

In this example, the body 25 of the damper 20" comprises an outer tubular casing 25', closed by the end faces 26 and 27, and lined internally, over the greater part of its axial dimension by an inner tubular casing 25", rigidly connected to the outer casing 25' from which it is separated radially by an elongated area 42 with a narrowed cross-section.

The main piston 28, slidable axially and substantially pressure-tight, is fitted in the inner casing 25", which is not connected to the end faces 26 and 27 but comprises at one axial end a transverse wall 43 through which the rod 31 slides axially and is substantially pressure-tight. The rigid connection between the casings 25' and 25" is shown schematically in FIG. 8 by radial spacers 44, but may be embodied by any different appropriate means. Thus, one 29 of the working chambers is delimited in the inner casing 25", between the main piston 28 and the transverse wall 43, while the other working chamber 30, on the other side of the main piston 28 in the inner casing 25", communicates permanently, via the elongated area with narrowed cross-section 42, with an appended chamber 45 delimited between the end face 26 and the transverse wall 43. This transverse wall 43 has a channel 32' running axially through it, in which a secondary piston 33' is fitted, slidable and substantially pressure-tight, loaded by a spring 34" bearing at one end against the end face 26 and at the other end against the secondary piston 33'. As in the examples in FIGS. 4 and 5, the secondary piston 33' allows fluid to be transferred from one working chamber 29 or 30 to the other 30 or 29, via the appended chamber 45 and the elongated area 42 with a narrowed cross-section, which is an area of relatively great length to utilise the principle of fluid inertia, as this area of 42 is an area of acceleration of the fluid displaced. When movements of the secondary piston 33' occur, the actual mass of the fluid displaced is small, but its acceleration is very great in the area 42 which is greatly narrowed, and this results in a very large equivalent mass, whereas the actual mass of the secondary piston 33' may be reduced. It will be recalled that the equivalent mass is that which, with a velocity ẋ equal to that of the secondary piston imparted to it, would have the same kinetic energy ½ mẋ² as that of all of the masses in movement (secondary piston and fluid displaced by this piston). As do those in FIGS. 4 and 5, the example in FIG. 8 comprises two passages 32' and 35 between the working chambers 29 and 30, and its dimensioning enables the secondary piston 33' to be made to resonate in the channel 32' at the frequency Ω, without substantial damping, on one hand, and on the other the secondary piston 33' to be blocked in the channel 32' by the spring 34 at the frequency ωδ, for which the transfer of fluid takes place mainly via the port 35 with high damping at this frequency, in substantially the same conditions as for the example in FIG. 4 and as described above.

As a variant, the main piston 28 may have running through it several restriction ports such as 35, calibrated to different cross-sections, in order to provide optimum restriction of the fluid at the natural drag frequency ωδ. Also as a variant, the metering port 35 or one of them may be formed by an annular passage with a small radial dimension between the main piston 28 and the body 25 of the damper, in which case this piston 28 is not fitted to be slidable and pressure-tight in the body 25. Again as a variant, the metering port 35, or one of them, may be made through the secondary piston 33 or 33', whether the latter slides in the main piston 28 or in a wall 43 of an inner casing 25" of the damper body 25, and/or at least one restriction port may also be made through a wall such as 43 of an inner casing such as 25" of the body, or of any other part of the body 25 provided that this restriction port communicates via each of its two ends with one respectively of the two working chambers 29, 30.

Of course, the fitting of such a drag damper is not limited to the type of main rotor according to FIGS. 1 and 2, and it can be fitted to other types of main rotors, particularly such as those described in FR 2 427 251, in which the hub is a plate or radial ring with axial recesses running through it, each of them housing means of connecting and hinging a blade to the hub, or FR 2 456 034, or FR 2 529 860, in which the hub body is a central shaft supporting two radial plates spaced apart, between which are secured the means of connecting and hinging the blades to the hub, and the root of each blade may comprise a loop which surrounds the means of securing and hinging, themselves secured between the two plates of the hub.

The invention has now been described in detail for purposes of clarity of understanding. However, it will be appreciated that certain changes and modifications may be practical within the scope of the appended claims.

What is claimed is:

1. A drag damper for a rotary-wing aircraft rotor comprising a hub and at least two blades each of which is connected to said hub by a corresponding connecting device, the drag damper being designed to be fitted between two elements, one of which is a flapping mass comprising one of the blades and said corresponding connection device, and the other element is one of the hub and an adjacent flapping mass on the hub, so as to damp relative angular drag movements between said two elements, each flapping mass having by design a natural frequency in drag (ωδ) different from a nominal rotation frequency (Ω) at which the rotor is designed to be driven, the drag damper comprising:

a tubular damper body closed by two end faces,
a main piston, slidable axially, fitted in the body and delimiting in said body two opposing variable volume working chambers,
a rod moving integrally with the main piston and running approximately axially through at least one end face of the body,
said body and said rod each comprising a connector for connecting respectively to one of the two components between which said drag damper is fitted,
a fluid filling at least the two working chambers in the body, and
at least one restriction port made in the drag damper and capable of restricting fluid passing from one working chamber to the other when the main piston is moved in the body,
wherein the drag damper further comprises at least one channel communicating with the two working chambers, the at least one channel being fitted with a slidable and substantially pressure-tight secondary piston loaded by an elastic bias tending to return said secondary piston to a neutral position in said channel, with the at least one channel having a greater cross-sectional area than the restriction port, and with the secondary piston and the elastic bias being dimensioned in such a way that the secondary piston has a resonance frequency in the channel substantially equal to the rotation frequency (Ω) of the rotor so as to filter a dynamic component of stresses applied to the damper at the rotational frequency of the rotor; and wherein the elastic bias substantially blocks the secondary piston in said channel at the natural drag frequency of the flapping mass; and wherein said at least one restriction port is calibrated so as to dampen substantially relative movements of the rod-main piston assembly and of the damper body at a frequency which is substantially equal to the natural drag frequency of the flapping mass.

2. A drag damper according to claim 1, wherein said channel is provided in said main piston and has longitudinal end parts which each open directly into one respectively of the working chambers.

3. A drag damper according to claim 2, wherein said channel runs substantially axially through said main piston and said elastic bias comprises two springs each running substantially axially through one respectively of the two working chambers and each engaged in one respectively of the longitudinal end parts of said channel, each spring bearing at one end against the secondary piston and at its opposite end against one respectively of said end faces.

4. A drag damper according to claim 3, wherein the secondary piston and fluid displaced by it have an equivalent mass m and the elastic bias has a stiffness K which substantially satisfy the relation K=mΩ², where Ω is the nominal rotation frequency at which the rotor is designed to be driven.

5. A drag damper according to claim 1, wherein said elastic bias comprises two springs each housed in one respectively of two longitudinal end parts of said channel, and each bearing at one end against the secondary piston and at its opposite end against the main piston.

6. A drag damper according to claim 5, wherein the secondary piston and fluid displaced by the latter have an equivalent mass m and the elastic bias has a stiffness K which substantially satisfy the relation $$K = m\Omega^2 \left(1 - \frac{s1}{s0}\right),$$

where s1 and s0 are cross-sectional areas respectively of the at least one channel and main piston, and Ω is the nominal rotational frequency at which the rotor is designed to be driven.

7. A drag damper according to claim 1, wherein said body comprises two tubular casings rigidly connected to each other, one of which is an outer casing closed by said end faces and the other is an inner casing, arranged inside the outer casing so as to delimit with the outer casing at least one area of narrowed cross-section, and in which is fitted the main piston, slidable axially, said inner casing comprising a transverse wall with said rod slidable axially running through it and in which said channel is made.

8. A drag damper according to claim 7, wherein the secondary piston and fluid displaced by it have an equivalent mass m and the elastic bias has a stiffness K which substantially satisfy the relation K=mΩ², where Ω is the nominal rotation frequency at which the rotor is designed to be driven.

9. A drag damper according to claim 7, wherein said channel runs substantially axially through said transverse wall of said inner casing, and said elastic bias comprises at least one spring bearing at one end against one of said end faces and at its opposite end against said secondary piston.

10. A drag damper according to claim 9, wherein the secondary piston and fluid displaced by it have an equivalent mass m and the elastic bias has a stiffness K which substantially satisfy the relation K=mΩ², where Ω is the nominal rotation frequency at which the rotor is designed to be driven.

11. A drag damper according to claim 1, wherein said at least one restriction port runs substantially axially through said main piston fitted to be slidable and pressure-tight in said body.

12. A drag damper according to claim 1, wherein said main piston is drilled with several restriction ports calibrated to different cross-sections.

13. A drag damper according to claim 1, wherein at least one restriction port runs through a part of one of said body and said secondary piston.

14. A drag damper according claim 1, wherein the elastic bias has a stiffness K that is greater than a threshold value.

15. A drag damper according to claim 14, wherein, in case of singular pressure losses via at least one restriction port, said threshold value is approximately equal $$\omega\delta \cdot v2 \cdot \lambda 2 \cdot \frac{s1^2}{s2},$$

where ωδ is the natural frequency in drag, λ2 is a coefficient of singular pressure loss of said at least one restriction port, v2 is a maximum velocity of circulation of said fluid in said restriction port and s2 is a cross-sectional area of the at least one channel.

16. A drag damper according to claim 15, wherein, in case of laminar pressure losses via at least one restriction port, said threshold value is approximately equal to $$\omega\delta \cdot C2 \cdot \frac{s1^2}{s2},$$

where C2 is a coefficient of laminar pressure loss of said at least one restriction port.

17. A rotary-wing aircraft having a rotor comprising a hub, at least two blades each of which is connected to said hub by a corresponding connecting device, and a drag damper fitted between two elements, one of which is a flapping mass comprising one of the blades and said corresponding connection device, and the other element is one of the hub and an adjacent flapping mass on the hub, so as to damp relative angular drag movements between said two elements, each flapping mass having by design a natural frequency in drag (ωδ) different from a nominal rotation frequency (Ω) at which the rotor is designed to be driven, the drag damper comprising:

a tubular damper body closed by two end faces, a main piston, slidable axially, fitted in the body and delimiting in said body two opposing variable volume working chambers, a rod moving integrally with the main piston and running approximately axially through at least one end face of the body, said body and said rod each comprising a connector for connecting respectively to one of the two components between which said drag damper is fitted, a fluid filling at least the two working chambers in the body, and at least one restriction port made in the drag damper and capable of restricting fluid passing from one working chamber to the other when the main piston is moved in the body, wherein the drag damper further comprises at least one channel communicating with the two working chambers, the at least one channel being fitted with a slidable and substantially pressure-tight secondary piston loaded by an elastic bias tending to return said secondary piston to a neutral position in said channel, with the at least one channel having a greater cross-sectional area than the restriction port, and with the secondary piston and the elastic bias being dimensioned in such a way that the secondary piston has a resonance frequency in the channel substantially equal to the rotation frequency (Ω) of the rotor so as to filter a dynamic component of stresses applied to the damper at the rotational frequency of the rotor; and wherein the elastic bias substantially blocks the secondary piston in said channel at the natural drag frequency of the flapping mass; and wherein said at least one restriction port is calibrated so as to dampen substantially relative movements of the rod-main piston assembly and of the damper body at a frequency which is substantially equal to the natural drag frequency of the flapping mass.

* * * * *